US011877969B1

(12) United States Patent
Brown, Jr.

(10) Patent No.: US 11,877,969 B1
(45) Date of Patent: Jan. 23, 2024

(54) PERSONAL ASSISTIVE DEVICE

(71) Applicant: Maynard H. Brown, Jr., Fishers Landing, NY (US)

(72) Inventor: Maynard H. Brown, Jr., Fishers Landing, NY (US)

( * ) Notice: Subject to any disclaimer, the term of this patent is extended or adjusted under 35 U.S.C. 154(b) by 0 days.

(21) Appl. No.: 18/307,077

(22) Filed: Apr. 26, 2023

Related U.S. Application Data

(63) Continuation-in-part of application No. 29/871,521, filed on Feb. 22, 2023, now Pat. No. Des. 994,548.

(51) Int. Cl.
*A61G 7/10* (2006.01)
*A61G 7/00* (2006.01)

(52) U.S. Cl.
CPC ......... *A61G 7/1049* (2013.01); *A61G 7/1044* (2013.01); *A61G 7/104* (2013.01)

(58) Field of Classification Search
CPC ..... A61G 7/1044; A61G 7/1049; A61G 7/104
USPC ............................... 5/662, 658, 503.1, 507.1
See application file for complete search history.

(56) References Cited

U.S. PATENT DOCUMENTS

| | | | | |
|---|---|---|---|---|
| 2,430,235 A * | 11/1947 | Mendenhall | A61H 3/00 | 108/152 |
| 2,734,554 A | 2/1956 | Ries | | |
| 2,759,525 A * | 8/1956 | Ries | A61H 3/04 | 482/67 |
| 3,232,251 A * | 2/1966 | Hughes | A61H 3/00 | 108/50.16 |
| 3,354,893 A * | 11/1967 | Schmerl | A61H 3/04 | 482/68 |
| 3,591,874 A * | 7/1971 | O'Kennedy | A61G 7/1038 | 5/503.1 |
| 3,739,793 A | 6/1973 | Wilson | | |
| 3,957,071 A * | 5/1976 | Kenner | A61H 3/00 | 108/115 |

(Continued)

FOREIGN PATENT DOCUMENTS

GB 2190004 A 11/1987

OTHER PUBLICATIONS

"Chair Assist for Elderly Chair Lift Devices Seniors Bed Rails for Elderly Adults Mobility & Daily Living Aids Stand Assist Patient Lift Elderly Assistance Products for Sitting, Sofa, Couch Support", retrieved from the internet, retrieved on Feb. 21, 2023; <URL: https://www.amazon.com/Elderly-Assist-Couch-Mobility-Standing-Recliner/dp/B07V7W67QT?ref_=ast_sto_dp>.

(Continued)

*Primary Examiner* — Robert G Santos

(57) ABSTRACT

A personal assistive device is an apparatus that enables the user to safely self-reposition with little or no help from other users. The apparatus includes a floor base, an upright support, a bracing handle, and a shelf. The floor base serves to secure the upright support to the floor to provide balance to the upright support and to prevent the upright support from moving while the user is holding onto the apparatus. The upright support is an elongated structure long enough to position the bracing handle at a height where the user can easily reach the bracing handle. The bracing handle serves as a secure object the user can grab onto to prevent the user from falling while the user is repositioning using the apparatus. The shelf serves to retain various items close to the user while the user is resting on a fixture.

17 Claims, 8 Drawing Sheets

(56) References Cited

U.S. PATENT DOCUMENTS

| | | | | | |
|---|---|---|---|---|---|
| 4,074,683 | A * | 2/1978 | Di Chiara | A61H 3/00 | 211/164 |
| 4,345,790 | A * | 8/1982 | Coe | A61H 3/00 | 297/45 |
| 4,452,484 | A * | 6/1984 | Pastor | A47D 13/04 | 297/150 |
| 4,708,274 | A * | 11/1987 | Roche | A61H 3/00 | 224/407 |
| 4,964,182 | A * | 10/1990 | Schmerler | A61G 7/10 | 5/81.1 R |
| 5,170,810 | A * | 12/1992 | Chapin | A61H 3/00 | 224/281 |
| 5,217,032 | A * | 6/1993 | Jobst | A61H 3/00 | 297/5 |
| 5,226,439 | A | 7/1993 | O'Keeffe et al. | | |
| 5,257,425 | A * | 11/1993 | Shinabarger | A61G 7/1046 | 5/507.1 |
| 5,273,063 | A * | 12/1993 | Farr | A61H 3/00 | 482/66 |
| 5,305,773 | A * | 4/1994 | Browning | A61G 7/1038 | 135/65 |
| 5,347,666 | A * | 9/1994 | Kippes | A61G 7/1038 | 5/81.1 R |
| 5,392,802 | A * | 2/1995 | Farr | A61H 3/00 | D6/406.1 |
| 5,449,013 | A | 9/1995 | Landers | | |
| 5,509,152 | A * | 4/1996 | Kippes | A61G 7/1074 | 5/81.1 R |
| 5,531,238 | A * | 7/1996 | Azzarelli | A61H 3/00 | 248/231.21 |
| 5,904,168 | A * | 5/1999 | Alulyan | A61H 3/00 | 135/65 |
| 6,145,524 | A * | 11/2000 | Li | A61H 3/00 | 135/69 |
| 6,244,285 | B1 * | 6/2001 | Gamache | A47C 31/00 | 5/426 |
| 6,401,280 | B1 | 6/2002 | Baker | | |
| 6,571,915 | B1 * | 6/2003 | de la Tour | E06C 1/393 | 297/DIG. 10 |
| 6,719,094 | B2 * | 4/2004 | de la Tour | E06C 1/383 | 297/DIG. 10 |
| 6,860,281 | B1 | 3/2005 | Clift | | |
| 6,883,529 | B2 * | 4/2005 | Kvaternik | A61H 3/00 | 135/66 |
| 7,712,477 | B2 * | 5/2010 | McCarthy | A61H 3/04 | 482/68 |
| D619,938 | S * | 7/2010 | McCarthy | D12/133 | |
| 7,775,228 | B2 * | 8/2010 | Clark | A61H 3/02 | 5/81.1 R |
| 7,980,263 | B2 * | 7/2011 | McCarthy | A61H 3/04 | 224/407 |
| 8,256,442 | B2 * | 9/2012 | McCarthy | A61H 3/04 | 482/68 |
| 8,631,811 | B2 * | 1/2014 | McCarthy | A61H 3/04 | 482/69 |
| 2003/0196856 | A1 * | 10/2003 | de la Tour | E06C 1/393 | 182/152 |
| 2005/0067004 | A1 * | 3/2005 | Kvaternik | A61H 3/00 | 135/67 |
| 2009/0120479 | A1 * | 5/2009 | McCarthy | A61H 3/04 | 224/407 |
| 2010/0078052 | A1 * | 4/2010 | Clark | A61G 7/1038 | 135/65 |
| 2010/0212707 | A1 * | 8/2010 | McCarthy | A61H 3/04 | 135/66 |
| 2011/0271991 | A1 * | 11/2011 | McCarthy | A61H 3/04 | 135/66 |
| 2012/0318312 | A1 * | 12/2012 | McCarthy | A61H 3/04 | 135/66 |

OTHER PUBLICATIONS

"DIALDRCARE Medical Bed Assist Rail with Storage Pocket—Adult Bedside Standing Bar for Seniors, Elderly, Handicap—Adjustable Fall Prevention Safety Handle Guard—Long Hand Bedrail Grab Bar (Black)" retrieved from the Internet, retrieved on Feb. 21, 2023; <URL: https://www.amazon.com/DIALDRCARE-Medical-Bed-Assist-Rail/dp/B0B18GLS6K>.

"Traditional Push Wagon", retrieved from the internet, retrieved on Feb. 22, 2023; <URL: https://arirotoys.com/products/traditional-push-wagon>.

"UNDERTHESUN", retrieved from the internet, retrieved on Feb. 22, 2023; <URL: https://www.pinterest.ca/pin/425871708496222985/>.

Flat-pack bike & scooter—Make: retrieved from the internet, retrieved on Feb. 22, 2023; <URL: https://www.pinterest.com.pin/659495939200832490/>.

"Wooden Games" retrieved from the internet, retrieved on Feb. 22, 2023; <URL: https://www.pinterest.ca/pin/109282728450136030/>.

* cited by examiner

PERSONAL ASSISTIVE DEVICE

The current application is a continuation-in-part (CIP) application of the U.S. design application serial number 29/871,521 filed on Mar. 2, 2023.

FIELD OF THE INVENTION

The present invention relates generally to household devices and adaptive medical equipment. More specifically, the present invention discloses a personal assistive device that helps users with disabilities to safely perform everyday activities at home.

BACKGROUND OF THE INVENTION

Nowadays, many people suffer from various physical disabilities that prevent them from doing normal activities. For example, many elderly people have a hard time performing normal activities such getting up from bed or a chair due to old age, injuries, or other physical ailments. To help users with physical disabilities, several assistive devices have been made available to accommodate the disabilities of the users. Assistive devices include different devices that help users with physical disabilities to perform various activities with little or no assistance from others. For example, railings are available that can be installed along stairs or bathrooms so that users can safely support themselves by holding onto the railing. However, many assistive devices have limited use as they are designed with limited flexibility on where or how they can be used. For example, railings and other similar support devices can often be too long to fit in smaller spaces, such as small bathrooms, or there may not be a structure on which they can be installed, such as in the middle of a living room. There are some portable assistive devices that can be used in different locations, such as walkers, without the need for them to be fixed to a location. However, many of these portable assistive devices are not safe to use when the user is trying to move from one position to another as the devices are not safely anchored and may move while the user is repositioning. So, there is a need for a fixed assistive device that can be easily installed at the desired location to enable the user to safely reposition around the house.

An objective of the present invention is to provide a personal assistive device that is designed to help users to safely reposition themselves with little or no assistance from someone else. The present invention is designed to help users with disabilities to safely reposition from a sitting position to a standing position and vice versa. Another objective of the present invention is to provide a personal assistive device that can be secured to the floor adjacent to the desired piece of furniture. The present invention can be anchored to the floor or weighed down with one or more weights so that the present invention is stable and does not move while the user is holding onto the present invention for support. Another objective of the present invention is to provide a personal assistive device with a shelf to hold various items for the user when the present invention is not in use. The shelf of the present invention can be used to hold containers, drinks, and other items the user wants to keep close by. Additional features and benefits of the present invention are further discussed in the sections below.

SUMMARY OF THE INVENTION

The present invention provides a personal assistive device designed to facilitate the safe repositioning of a user with little or no assistance from others. The present invention enables users with a physical disability to perform everyday activities around their house in a safe manner. For example, the present invention can help users to safely get up from a bed or sofa as well as to safely lay down on the bed or sofa. The present invention can also be used to help senior users to safely use the toilet as well as any other activities that requires the user to reposition.

In the preferred embodiment, the present invention includes a floor base that enables the anchoring of the present invention to the floor to maintain the present invention stable and secure. Alternatively, the floor base can retain one or more weights to maintain the present invention secure and stable. The present invention further includes an upright support that elevates a bracing handle which the user can grab onto while repositioning. In addition, the present invention includes a shelf designed to retain various items the user wants to keep nearby.

DETAIL DESCRIPTIONS OF THE INVENTION

Figure 1:
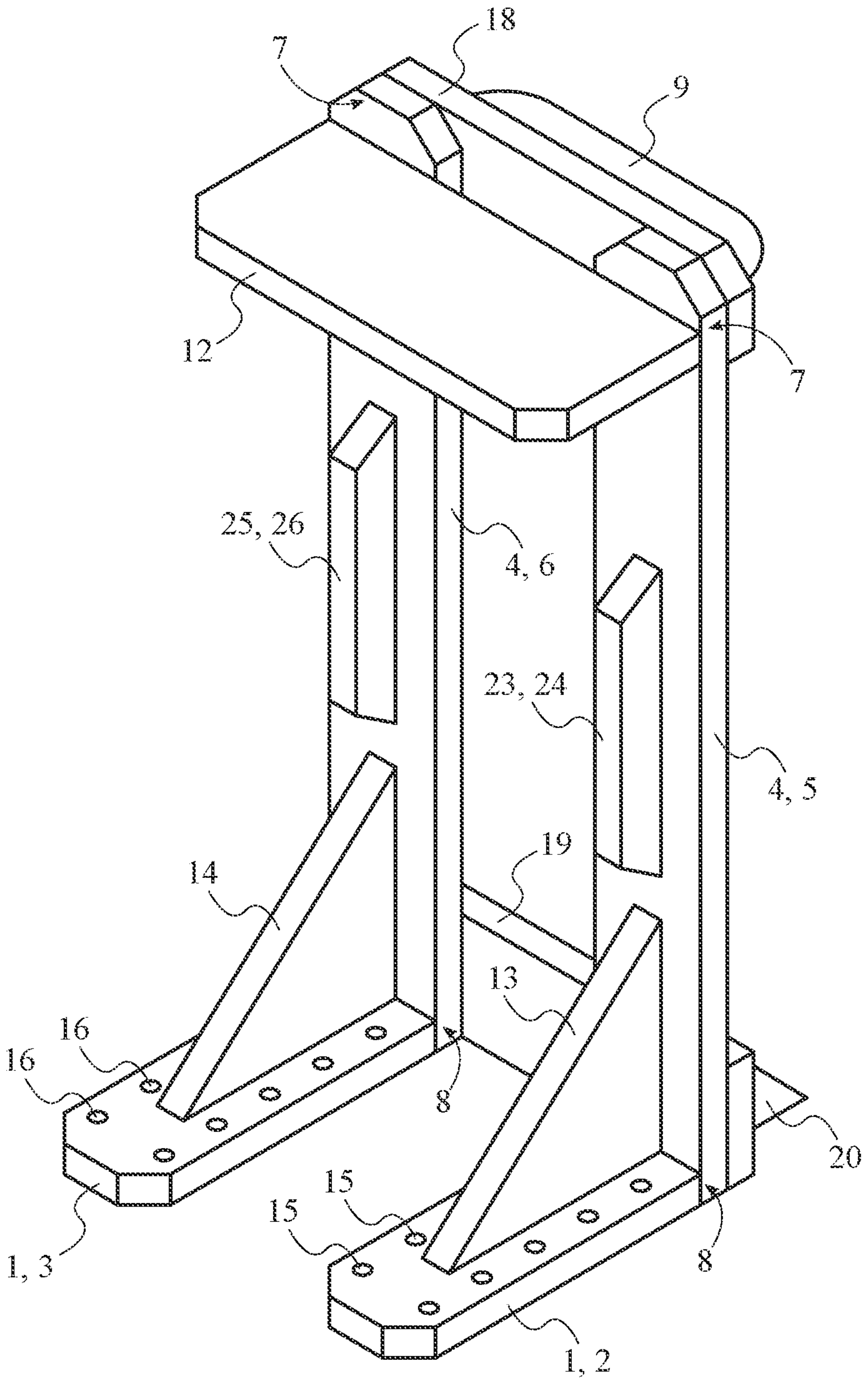
FIG. 1 is a top front perspective view of the present invention.
Figure 2:
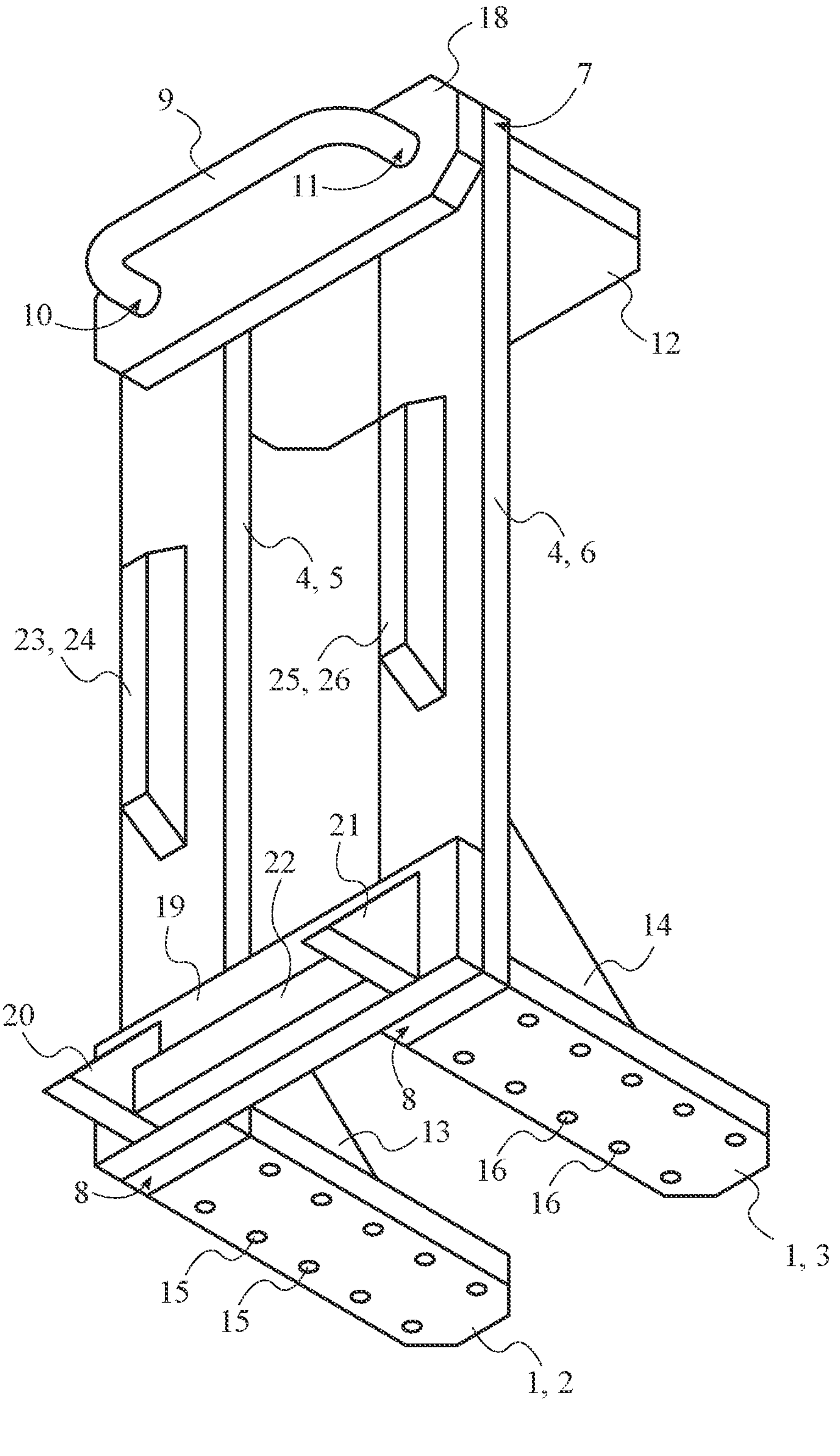
FIG. 2 is a bottom rear perspective view of the present invention.
Figure 3:
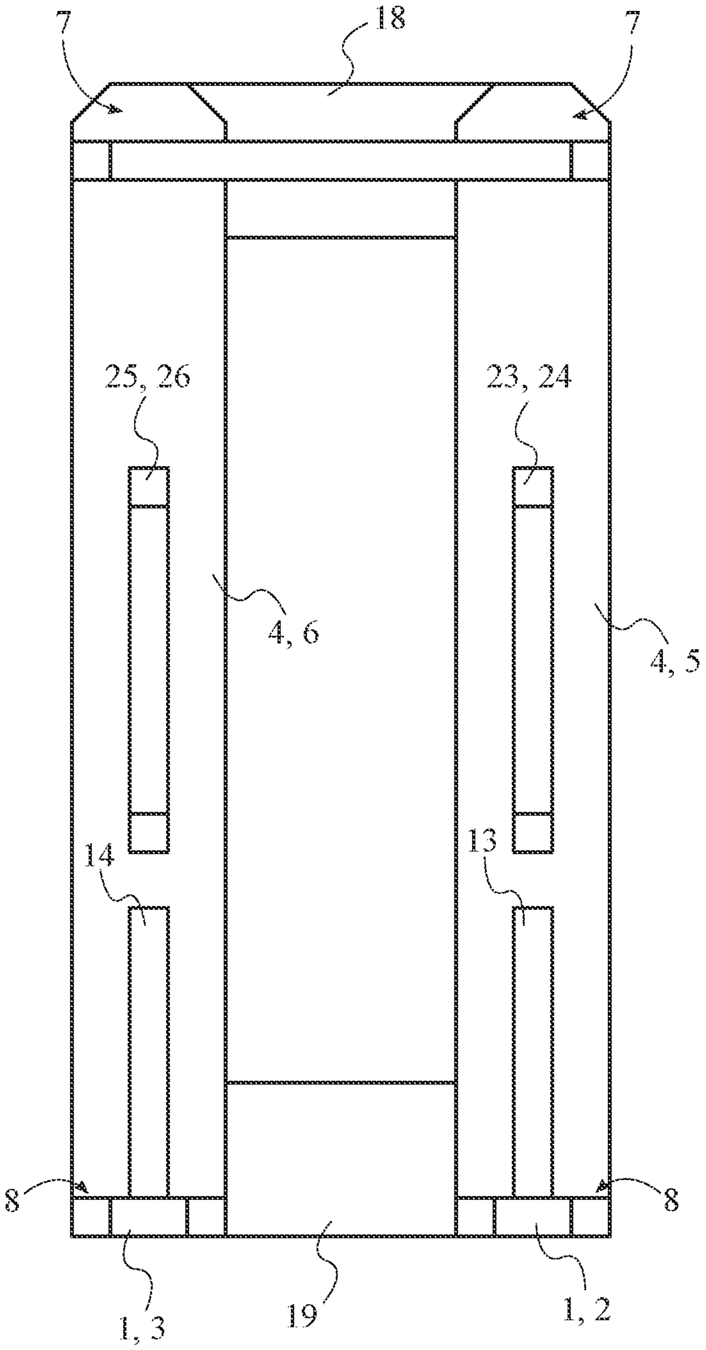
FIG. 3 is a front view of the present invention.
Figure 4:
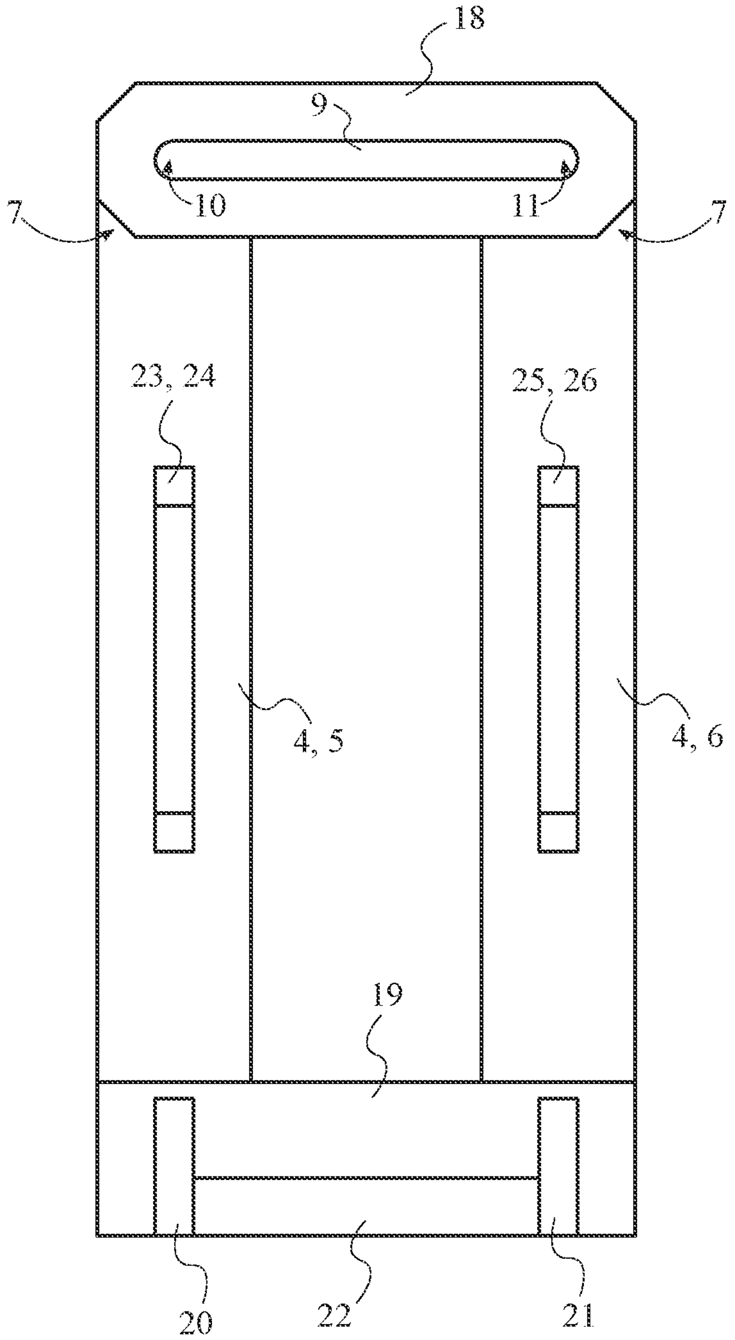
FIG. 4 is a rear view of the present invention.
Figure 5:
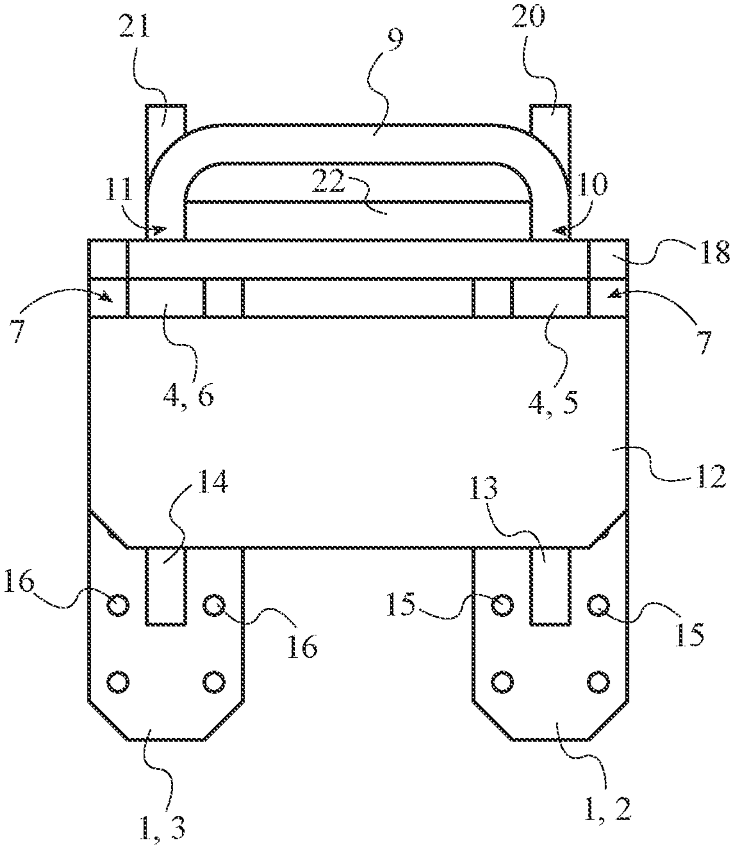
FIG. 5 is a top view of the present invention.
Figure 6:
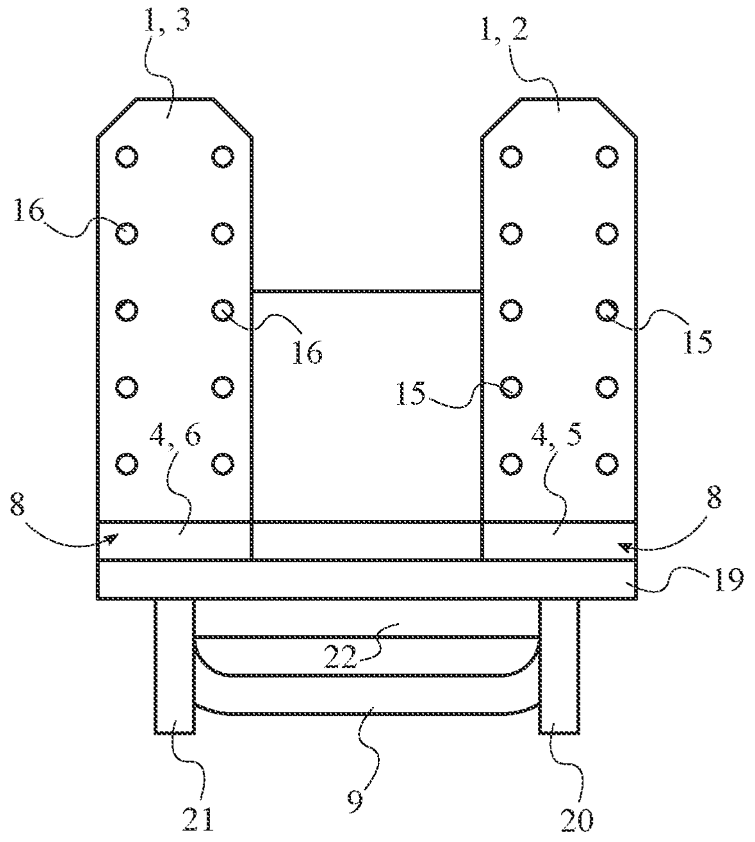
FIG. 6 is a bottom view of the present invention.
Figure 7:
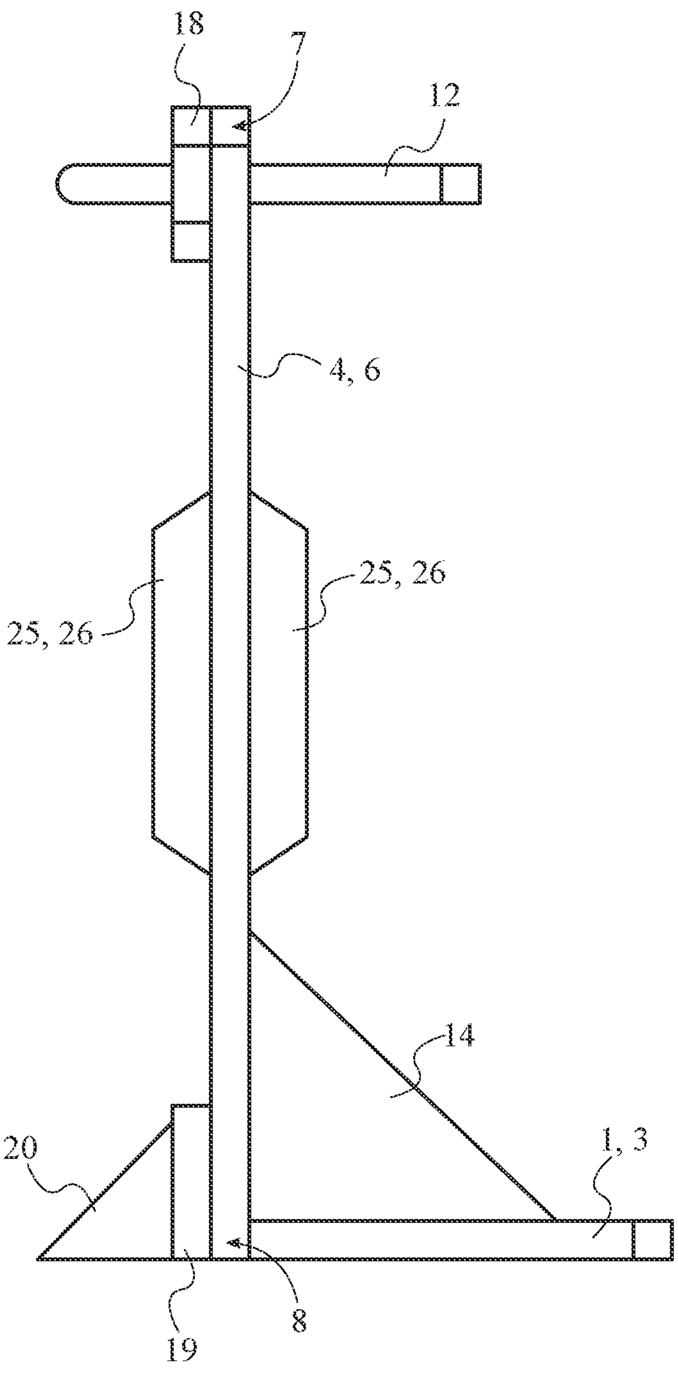
FIG. 7 is a side view of the present invention.

All illustrations of the drawings are for the purpose of describing selected versions of the present invention and are not intended to limit the scope of the present invention.

The present invention is a personal assistive device. The personal assistive device enables users to safely self-reposition with little or no help from other users. As can be seen in FIGS. 1 through 7, the present invention comprises a floor base 1, an upright support 4, a bracing handle 9, and a shelf 12. The floor base 1 serves to secure the upright support 4 to the floor to provide balance to the upright support 4 and to prevent the upright support 4 from moving while the user is holding onto the present invention. The upright support 4 serves to elevate the bracing handle 9 to a height that makes the bracing handle 9 accessible to the user. The bracing handle 9 serves as a secure object the user can grab onto while repositioning from a standing position to a sitting position, and vice versa. The shelf 12 serves to retain various items close to the user while the user is resting on a fixture.

The general configuration of the aforementioned components enables the user to safely and comfortably reposition from a sitting position to a standing position and vice versa. As can be seen in FIGS. 1 through 7, the upright support 4 is preferably a thin elongated structure large enough to position the bracing handle 9 at a height where the user can reach while sitting down or standing up. The upright support 4 is also designed to be light but rigid enough to support the load from the user. Accordingly, the upright support 4 comprises a first support column 5 and a second support column 6. The first support column 5 and the second support column 6 are two flat elongated pieces of material of equal length, width, and thickness. For example, the first support column 5 and the second support column 6 can be two pieces of wood planks with a length of 30 inches (in.), a width of four in., and a thickness of one in. Further, the first support column 5 and the second support column 6 each comprise a proximal column end 7 and a distal column end 8 corresponding to the terminal ends of each support column. The bracing handle 9 is preferably an elongated curved handle large enough to accommodate both hands of the user. For example, the bracing handle 9 can be a 12 in. plastic or metallic handle. So, the bracing handle 9 comprises a first handle end 10 and a second handle end 11 corresponding to the terminal ends of the bracing handle 9. Further, the shelf 12 is preferably a flat piece of material large enough to accommodate small items such as glasses, drinking containers, etc. For example, the shelf 12 can be a wooden shelf with a length of 13.5 in., a width of four in., and a thickness of one in. In other embodiments, the different portions of the present invention can be made from different materials with different sizes.

In the preferred embodiment, the present invention is assembled as follows. As can be seen in FIGS. 1 through 7, the first support column 5 and the second support column 6 are positioned parallel and offset to each other to form an elongated flat structure. In addition, the upright support 4 is positioned normal to the floor base 1 which is preferably positioned parallel to the floor to form an upright structure. The distal column end 8 of the first support column 5 and the distal column end 8 of the second support column 6 are connected onto the floor base 1 so that both the first support column 5 and the second support column 6 are connected to the floor base 1. Further, the first handle end 10 is laterally mounted to the first support column 5, adjacent to the proximal column end 7 of the first support column 5. This secures the bracing handle 9 to the first support column 5. Similarly, the second handle end 11 is laterally mounted to the second support column 6, adjacent to the proximal column end 7 of the second support column 6. This also secures the bracing handle 9 to the second support column 6. Further, the shelf 12 is positioned parallel to the floor base 1 so that the items placed on the shelf 12 do not fall off the shelf 12. The shelf 12 is also positioned opposite to the bracing handle 9 about the upright support 4 so that the bracing handle 9 and the shelf 12 are not obstructed by each other. Further, the shelf 12 is connected in between the first support column 5 and the second support column 6, adjacent to the proximal column end 7 of the first support column 5 and the proximal column end 7 of the second support column 6. This secures the shelf 12 to the upright support 4 so that the shelf 12 can support any items placed onto the shelf 12.

Similar to the upright support 4, the floor base 1 is also designed lightweight but rigid enough to maintain the upright support 4 balanced and to prevent the present invention from moving when the user is holding onto the bracing handle 9. As can be seen in FIGS. 1 through 7, the floor base 1 may further comprise a first base leg 2 and a second base leg 3. The first base leg 2 and the second base leg 3 are preferably long and wide pieces of material that provide the necessary structural support to the upright support 4. For example, the first base leg 2 and the second base leg 3 can be two pieces of wood with a length of 11 in., a width of four in., and a thickness of one in. The first base leg 2 and the second base leg 3 are arranged to match the arrangement of the first support column 5 and the second support column 6. So, the first base leg 2 and the second base leg 3 are positioned parallel and offset to each other to match the positioning of the first base leg 2 and the second base leg 3. Further, the distal column end 8 of the first support column 5 is terminally connected to the first base leg 2 to connect the first support column 5 to the first base leg 2. Likewise, the distal column end 8 of the second support column 6 is terminally connected to the second base leg 3 to connect the second support column 6 to the second base leg 3. In other embodiments, the floor base 1 can be shaped differently and made from different materials and sizes.

As can be seen in FIGS. 1 through 7, to add balance and support to the whole assembly, the present invention may further comprise a first counterfort 13 and a second counterfort 14. The first counterfort 13 and the second counterfort 14 are designed to provide lateral support to the upright support 4 to prevent the bending of the upright support 4 close to the floor base 1. To do so, the first counterfort 13 is connected in between the first support column 5 and the first base leg 2. This way, the first counterfort 13 helps maintain the first support column 5 in a vertical orientation. Further, the second counterfort 14 is connected in between the second support column 6 and the second base leg 3. This way, the second counterfort 14 helps maintain the second support column 6 in a vertical orientation, like the first counterfort 13. In other embodiments, the present invention can utilize different support mechanisms to maintain the upright support 4 in an overall vertical orientation.

As previously discussed, the floor base 1 is preferably anchored to the floor to prevent the present invention from moving while the user is holding onto the bracing handle 9. As can be seen in FIGS. 1 through 7, the present invention may further comprise a plurality of first fastener guides 15 and a plurality of second fastener guides 16. The plurality of first fastener guides 15 and the plurality of second fastener guides 16 enable the use of fasteners to secure the floor base 1 to the floor adjacent to the target fixture. Accordingly, the plurality of first fastener guides 15 is distributed along the first base leg 2 so that the first base leg 2 is evenly secured to the floor. Further, the plurality of first fastener guides 15 laterally traverses through the first base leg 2 to enable the fasteners to pass through the first base leg 2. Similarly, the plurality of second fastener guides 16 is distributed along the second base leg 3 so that the second base leg 3 is evenly secured to the floor. Further, the plurality of second fastener guides 16 laterally traverses through the second base leg 3 to enable the fasteners to pass through the first base leg 2. In other embodiments, different guides can be used to accommodate different fasteners.

Figure 8:
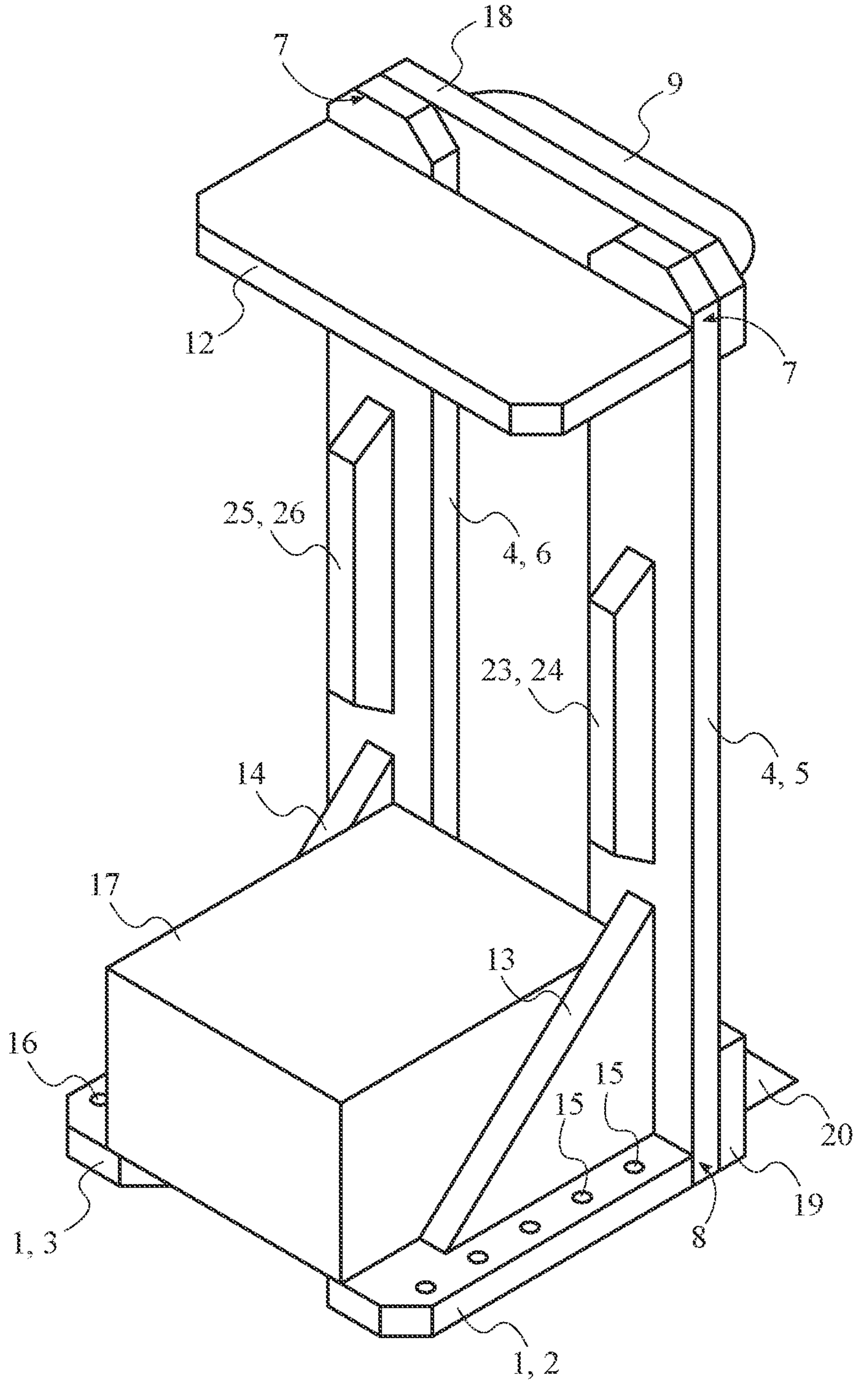
FIG. 8 is a top front perspective view of the present invention, wherein the present invention is shown with at least one weight.

In another embodiment, the floor base 1 may not be able to be secured to the floor for various reasons, such as not wanting to damage the floor. However, the floor base 1 needs to be kept secure against the floor to prevent the present invention from moving. As can be seen in FIG. 8, the present invention may further comprise at least one weight 17. The at least one weight 17 maintains the floor base 1 secure on the floor to prevent the upright support 4 from moving when the user grabs onto the bracing handle 9. For example, the at least one weight 17 can be a heavy object such as a cinder block that is heavy enough to prevent the present invention from moving while the user is grabbing onto the bracing handle 9. Accordingly, the at least one weight 17 is positioned adjacent to the upright support 4 so that the at least one weight 17 can be situated upon the floor base 1. This way, the floor base 1 is kept against the floor even when the user grabs onto the bracing handle 9 when getting up or laying down. In other embodiments, the floor base 1 may be made from heavy materials that do not require additional weights to keep the floor base 1 down.

As can be seen in FIGS. 1 through 7, to maintain the upright support 4 together, the present invention may further comprise a proximal crossbar 18. The proximal crossbar 18 helps increase the structural strength of the upright support 4 by securing the free ends of the first support column 5 and the second support column 6 together. To do so, the proximal crossbar 18 is positioned adjacent to the proximal column end 7 of the first support column 5 and the proximal column end 7 of the second support column 6, which preferably correspond to the free ends of the first support column 5 and the second support column 6. The proximal crossbar 18 is positioned parallel to the shelf 12. In addition, the proximal crossbar 18 is positioned opposite to the shelf 12 about the upright support 4. This way, the proximal crossbar 18 does not obstruct the shelf 12 and keeps the symmetrical structure of the upright support 4. Further, the proximal crossbar 18 is connected in between the first support column 5 and the second support column 6. Thus, the free ends of the first support column 5 and the second support column 6 are kept together to prevent undesired movement of either support column.

As can be seen in FIGS. 1 through 7, to not affect the structural strength of the upright support 4, the bracing handle 9 is secured to upright support 4 by the proximal crossbar 18. This way, the load on the bracing support is evenly transmitted to the upright support 4. To do so, the first handle end 10 is laterally connected to the proximal crossbar 18, adjacent to the proximal column end 7 of the first support column 5. Similarly, the second handle end 11 is laterally connected to the proximal crossbar 18, adjacent to the proximal column end 7 of the second support column 6. Thus, the bracing handle 9 is secured to the upright support 4 by the proximal crossbar 18.

As can be seen in FIGS. 1 through 7, to increase the overall structural strength of the present invention, the present invention may further comprise a distal crossbar 19. Similar to the proximal crossbar 18, the distal crossbar 19 adds structural strength to the upright support 4 to prevent detachment of the upright support 4 from the floor base 1. To do so, the distal crossbar 19 is positioned adjacent to the distal column end 8 of the first support column 5 and the distal column end 8 of the second support column 6 to position the distal crossbar 19 adjacent to the floor base 1. The distal crossbar 19 is also positioned parallel to the floor base 1. In addition, the distal crossbar 19 is positioned opposite to the floor base 1 about the upright support 4 so that the distal crossbar 19 does not obstruct the floor base 1. Further, the distal crossbar 19 is connected in between the first support column 5 and the second support column 6 to keep the fixed ends of the first support column 5 and the second support column 6 together. This way, the distal crossbar 19 keeps the fixed ends of the first support column 5 and the second support column 6 together to prevent the fixed ends from coming loose.

As can be seen in FIGS. 1 through 7, to add stability to the upright support 4, the present invention may further comprise a first stabilizing extension 20 and a second stabilizing extension 21. Similar to the first counterfort 13 and the second counterfort 14, the first stabilizing extension 20 and the second stabilizing extension 21 add lateral support to the upright support 4 to prevent the upright support 4 from tilting over. To do so, the first stabilizing extension 20 is laterally mounted to the distal crossbar 19, adjacent to the distal column end 8 of the first support column 5, to add stability to the first support column 5. Similarly, the second stabilizing extension 21 is laterally mounted to the distal crossbar 19, adjacent to the distal column end 8 of the second support column 6, to add stability to the second support column 6. In other embodiments, the present invention may utilize different stabilizing devices.

As can be seen in FIGS. 1 through 7, to prevent the first stabilizing extension 20 and the second stabilization extension from coming loose, the present invention may further comprise an extension spacer 22. The extension spacer 22 helps keep the first stabilizing extension 20 separate from the second stabilizing extension 21 at a predetermined distance. In addition, the extension spacer 22 provides lateral support to both the first stabilizing extension 20 and the second stabilizing extension 21. Accordingly, the first stabilizing extension 20 is terminally connected to the extension spacer 22 to secure the first stabilizing extension 20 to the extension spacer 22. Similarly, the second stabilizing extension 21 is terminally connected to the extension spacer 22, opposite the first stabilizing extension 20, to secure the second stabilizing extension 21 to the extension spacer 22. Further, the extension spacer 22 is laterally connected along the distal crossbar 19 to secure the extension spacer 22 to the distal crossbar 19. In other embodiments, different support devices can be utilized.

Due to the elongated structure of the upright support 4, the present invention may utilize lateral support devices to prevent the upright support 4 to bend while the user is grabbing onto the bracing handle 9. As can be seen in FIGS. 1 through 7, the present invention may further comprise at least one first guiding rib 23 that adds lateral structural support to the first support column 5. Accordingly, the at least one first guiding rib 23 is positioned offset from the proximal column end 7 of the first support column 5. In addition, the at least one first guiding rib 23 is also positioned offset from the distal column end 8 of the first support column 5. This way, the at least one first guiding rib 23 can be centrally positioned along the first support column 5. Further, the at least one first guiding rib 23 is laterally connected along the first support column 5. This way, the at least one first guiding rib 23 prevents the first support column 5 from bending in the middle when subjected to a load.

In some embodiments, the at least one first guiding rib 23 may be a pair of first guiding ribs 24 that can be distributed along the first support column 5 to add lateral strength to the first support column 5. As can be seen in FIGS. 1 through 7, the pair of first guiding ribs 24 are positioned opposite to each other about the first support column 5 to provide bilateral support to the first support column 5. This way, the pair of first guiding ribs 24 prevents the first support column 5 from bending forwards or backwards when the user is grabbing onto the bracing handle 9.

Similar to the first support column 5, the second support column 6 can also be equipped with lateral support devices to prevent the second support column 6 from bending. As can be seen in FIGS. 1 through 7, the present invention may further comprise at least one second guiding rib 25 that adds lateral support to the second support column 6. Accordingly, the at least one second guiding rib 25 is positioned offset from the proximal column end 7 of the second support column 6. In addition, the at least one second guiding rib 25 is also positioned offset from the distal column end 8 of the second support column 6. This way, the at least one second guiding rib 25 can be centrally positioned along the second support column 6. Further, the at least one second guiding rib is laterally connected along the second support column 6. This way, the at least one second guiding rib 25 prevents the second support column 6 from bending in the middle when subjected to a load.

In some embodiments, the at least one second guiding rib 25 may be a pair of second guiding ribs 26 that can be distributed along the second support column 6 to add lateral strength to the second support column 6. As can be seen in FIGS. 1 through 7, the pair of second guiding ribs 26 are positioned opposite to each other about the second support column 6 to provide bilateral support to the second support guide 6. This way, the pair of second guiding ribs 26 prevents the second support column 6 from bending forwards or backwards when the user is grabbing onto the bracing handle 9.

Although the invention has been explained in relation to its preferred embodiment, it is to be understood that many other possible modifications and variations can be made without departing from the spirit and scope of the invention.

What is claimed is:

1. A personal assistive device comprising:

a floor base;

an upright support;

a bracing handle;

a shelf;

a proximal crossbar;

the upright support comprising a first support column and a second support column;

the first support column and the second support column each comprising a proximal column end and a distal column end;

the bracing handle comprising a first handle end and a second handle end;

the first support column and the second support column being positioned parallel and offset to each other;

the upright support being positioned normal to the floor base;

the distal column end of the first support column and the distal column end of the second support column being connected onto the floor base;

the first handle end being laterally mounted to the first support column, adjacent to the proximal column end of the first support column;

the second handle end being laterally mounted to the second support column, adjacent to the proximal column end of the second support column;

the shelf being positioned parallel to the floor base;

the shelf being positioned opposite to the bracing handle about the upright support;

the shelf being connected in between the first support column and the second support column, adjacent to the proximal column end of the first support column and the proximal column end of the second support column;

the proximal crossbar being positioned adjacent to the proximal column end of the first support column and the proximal column end of the second support column;

the proximal crossbar being positioned parallel to the shelf;

the proximal crossbar being positioned opposite to the shelf about the upright support;

the proximal crossbar being connected in between the first support column and the second support column;

the first handle end being laterally connected to the proximal crossbar, adjacent to the proximal column end of the first support column; and the second handle end being laterally connected to the proximal crossbar, adjacent to the proximal column end of the second support column.

2. The personal assistive device as claimed in claim 1 comprising:

the floor base comprising a first base leg and a second base leg;

the first base leg and the second base leg being positioned parallel and offset to each other;

the distal column end of the first support column being terminally connected to the first base leg; and the distal column end of the second support column being terminally connected to the second base leg.

3. The personal assistive device as claimed in claim 2 comprising:

a first counterfort;

a second counterfort;

the first counterfort being connected in between the first support column and the first base leg; and the second counterfort being connected in between the second support column and the second base leg.

4. The personal assistive device as claimed in claim 2 comprising:

a plurality of first fastener guides;

a plurality of second fastener guides;

the plurality of first fastener guides being distributed along the first base leg;

the plurality of first fastener guides laterally traversing through the first base leg;

the plurality of second fastener guides being distributed along the second base leg; and the plurality of second fastener guides laterally traversing through the second base leg.

5. The personal assistive device as claimed in claim 1 comprising:

at least one weight;

the at least one weight being positioned adjacent to the upright support; and the at least one weight being situated upon the floor base.

6. The personal assistive device as claimed in claim 1 comprising:

a distal crossbar;

the distal crossbar being positioned adjacent to the distal column end of the first support column and the distal column end of the second support column;

the distal crossbar being positioned parallel to the floor base;

the distal crossbar being positioned opposite to the floor base about the upright support; and the distal crossbar being connected in between the first support column and the second support column.

7. The personal assistive device as claimed in claim 6 comprising:

a first stabilizing extension;

a second stabilizing extension;

the first stabilizing extension being laterally mounted to the distal crossbar, adjacent to the distal column end of the first support column; and the second stabilizing extension being laterally mounted to the distal crossbar, adjacent to the distal column end of the second support column.

8. The personal assistive device as claimed in claim 7 comprising:

an extension spacer;

the first stabilizing extension being terminally connected to the extension spacer;

the second stabilizing extension being terminally connected to the extension spacer, opposite the first stabilizing extension; and the extension spacer being laterally connected along the distal crossbar.

9. The personal assistive device as claimed in claim 1 comprising:

at least one first guiding rib;

the at least one first guiding rib being positioned offset from the proximal column end of the first support column;

the at least one first guiding rib being positioned offset from the distal column end of the first support column; and the at least one first guiding rib being laterally connected along first support column.

10. The personal assistive device as claimed in claim 9 comprising:

the at least one first guiding rib being a pair of first guiding ribs; and the pair of first guiding ribs being positioned opposite to each other about the first support column.

11. The personal assistive device as claimed in claim 9 comprising:

at least one second guiding rib;

the at least one second guiding rib being positioned offset from the proximal column end of the second support column;

the at least one second guiding rib being positioned offset from the distal column end of the second support column; and the at least one second guiding rib being laterally connected along second support column.

12. The personal assistive device as claimed in claim 11 comprising:

the at least one second guiding rib being a pair of second guiding ribs; and the pair of second guiding ribs being positioned opposite to each other about the second support column.

13. A personal assistive device comprising:

a floor base;

an upright support;

a bracing handle;

a shelf;

a distal crossbar;

a first stabilizing extension;

a second stabilizing extension;

an extension spacer;

the upright support comprising a first support column and a second support column;

the first support column and the second support column each comprising a proximal column end and a distal column end;

the bracing handle comprising a first handle end and a second handle end;

the first support column and the second support column being positioned parallel and offset to each other;

the upright support being positioned normal to the floor base;

the first handle end being laterally mounted to the first support column, adjacent to the proximal column end of the first support column;

the second handle end being laterally mounted to the second support column, adjacent to the proximal column end of the second support column;

the shelf being positioned parallel to the floor base;

the shelf being positioned opposite to the bracing handle about the upright support;

the shelf being connected in between the first support column and the second support column, adjacent to the proximal column end of the first support column and the proximal column end of the second support column;

the distal crossbar being positioned adjacent to the distal column end of the first support column and the distal column end of the second support column;

the distal crossbar being positioned parallel to the floor base;

the distal crossbar being positioned opposite to the floor base about the upright support;

the distal crossbar being connected in between the first support column and the second support column;

the first stabilizing extension being laterally mounted to the distal crossbar, adjacent to the distal column end of the first support column;

the second stabilizing extension being laterally mounted to the distal crossbar, adjacent to the distal column end of the second support column;

the first stabilizing extension being terminally connected to the extension spacer;

the second stabilizing extension being terminally connected to the extension spacer, opposite the first stabilizing extension; and the extension spacer being laterally connected along the distal crossbar.

14. The personal assistive device as claimed in claim 13 comprising:

a first counterfort;

a second counterfort;

a plurality of first fastener guides;

a plurality of second fastener guides;

the floor base comprising a first base leg and a second base leg;

the first base leg and the second base leg being positioned parallel and offset to each other;

the distal column end of the first support column being terminally connected to the first base leg;

the distal column end of the second support column being terminally connected to the second base leg;

the first counterfort being connected in between the first support column and the first base leg;

the second counterfort being connected in between the second support column and the second base leg;

the plurality of first fastener guides being distributed along the first base leg;

the plurality of first fastener guides laterally traversing through the first base leg;

the plurality of second fastener guides being distributed along the second base leg; and the plurality of second fastener guides laterally traversing through the second base leg.

15. The personal assistive device as claimed in claim 13 comprising:

at least one weight;

the at least one weight being positioned adjacent to the upright support; and the at least one weight being situated upon the floor base.

16. The personal assistive device as claimed in claim 13 comprising:

a proximal crossbar;

the proximal crossbar being positioned adjacent to the proximal column end of the first support column and the proximal column end of the second support column;

the proximal crossbar being positioned parallel to the shelf;

the proximal crossbar being positioned opposite to the shelf about the upright support;

the proximal crossbar being connected in between the first support column and the second support column;

the first handle end being laterally connected to the proximal crossbar, adjacent to the proximal column end of the first support column; and the second handle end being laterally connected to the proximal crossbar, adjacent to the proximal column end of the second support column.

17. The personal assistive device as claimed in claim 13 comprising:

a pair of first guiding ribs;

a pair of second guiding ribs;

the pair of first guiding ribs being positioned opposite to each other about the first support column;

the pair of first guiding ribs being positioned offset from the proximal column end of the first support column;

the pair of first guiding ribs being positioned offset from the distal column end of the first support column;

the pair of first guiding ribs being laterally connected along first support column;

the pair of second guiding ribs being positioned opposite to each other about the second support column;

the pair of second guiding ribs being positioned offset from the proximal column end of the second support column;

the pair of second guiding ribs being positioned offset from the distal column end of the second support column; and the pair of second guiding ribs being laterally connected along second support column.

* * * * *